United States Patent
Illers et al.

(10) Patent No.: US 8,606,376 B2
(45) Date of Patent: Dec. 10, 2013

(54) METHOD OF ACTUATING A SYSTEM, APPARATUS FOR MODIFYING A CONTROL SIGNAL FOR ACTUATION OF A SYSTEM AND METHOD OF TUNING SUCH AN APPARATUS

(75) Inventors: Hartmut Illers, Hahausen (DE); Kazuhiko Hidaka, Best (NL); Akinori Saito, Tsukuba (JP); Hans-Ulrich Danzebrink, Braunschweig (DE)

(73) Assignees: Mitutoyo Corporation, Kawasaki (JP); Bundesrepublik Deutschland, Endvertreten Durch den Präsidenten der Physikalisch-Technischen Bundesanstalt, Braunschweig (DE)

( * ) Notice: Subject to any disclaimer, the term of this patent is extended or adjusted under 35 U.S.C. 154(b) by 792 days.

(21) Appl. No.: 12/588,204

(22) Filed: Oct. 7, 2009

(65) Prior Publication Data

US 2011/0004326 A1   Jan. 6, 2011

(30) Foreign Application Priority Data

Jan. 14, 2009 (EP) .................................. 09000438

(51) Int. Cl.
    *G05B 11/01* (2006.01)
(52) U.S. Cl.
    USPC ............... 700/71; 700/72; 700/280; 310/321; 360/19; 360/97; 850/47; 850/54; 318/128; 318/451; 318/671; 318/686; 318/460; 331/116 R; 331/116 M; 331/96; 331/105; 331/151; 331/154; 331/155; 73/1.82; 73/579; 73/496; 73/778; 73/663; 73/105; 356/600
(58) Field of Classification Search
    USPC ............ 700/71, 72, 280; 310/321; 360/97.19; 850/47, 54; 318/128, 451, 671, 686, 318/460; 331/154, 96, 105, 151, 155, 331/116 R; 73/1.82, 579, 496, 778, 644–668
    See application file for complete search history.

(56) References Cited

U.S. PATENT DOCUMENTS 3,848,159 A    11/1974 Nye, Jr. et al.
3,978,420 A *  8/1976 Lane ............................. 330/107
(Continued)

FOREIGN PATENT DOCUMENTS

DE    297 14 612 U1    10/1997
DE    101 12 316 A1    12/2001
(Continued)

OTHER PUBLICATIONS

Terman, "Radio Engineering", 1937, McGraw Hill Book Company, pp. 51-98.*

(Continued)

*Primary Examiner* — Ryan A. Jarrett
*Assistant Examiner* — Olvin Lopez Alvarez
(74) *Attorney, Agent, or Firm* — Oliff & Berridge, PLC

(57) ABSTRACT

A method of actuating a system comprising a movable component and an actuator configured to move the movable component comprises providing a control signal representative of a desired motion of the movable component. The control signal is supplied to one or more resonators. Each of the one or more resonators has a mode of oscillation representative of at least one elastic mode of oscillation of the system. The control signal is modified by subtracting from the control signal a signal representative of a response of the one or more resonators to the control signal. The actuator is operated in accordance with the modified control signal. Thus, undesirable elastic oscillations of the system which might occur if the system were operated with the original control system can be reduced.

15 Claims, 7 Drawing Sheets

(56) References Cited

U.S. PATENT DOCUMENTS

| | | | | |
|---|---|---|---|---|
| 4,001,712 A | * | 1/1977 | Chambers et al. | 330/85 |
| 4,268,979 A | * | 5/1981 | Minnich | 434/46 |
| 4,270,061 A | | 5/1981 | Gronner et al. | |
| 4,732,483 A | | 3/1988 | Biegen | |
| 5,128,622 A | * | 7/1992 | Masuda et al. | 324/682 |
| 5,274,704 A | | 12/1993 | Jakab | |
| 5,305,158 A | * | 4/1994 | Ueda et al. | 360/75 |
| 5,459,383 A | * | 10/1995 | Sidman et al. | 318/611 |
| 5,477,135 A | | 12/1995 | Baker | |
| 5,499,002 A | * | 3/1996 | Kinsman | 333/187 |
| 5,545,954 A | * | 8/1996 | Furukoshi | 318/116 |
| 5,621,656 A | * | 4/1997 | Langley | 700/280 |
| 5,760,300 A | * | 6/1998 | Kajimura | 73/105 |
| 5,778,081 A | * | 7/1998 | Patrick | 381/71.5 |
| 5,781,294 A | | 7/1998 | Nakata et al. | |
| 5,798,927 A | * | 8/1998 | Cutler et al. | 700/188 |
| 5,799,049 A | * | 8/1998 | McFarland et al. | 375/362 |
| 6,002,232 A | * | 12/1999 | McConnell et al. | 318/629 |
| 6,268,766 B1 | * | 7/2001 | Thomasson | 327/557 |
| 6,296,093 B1 | * | 10/2001 | Norris et al. | 188/378 |
| 6,373,332 B2 | * | 4/2002 | Kawai | 327/556 |
| 6,566,854 B1 | | 5/2003 | Hagmann et al. | |
| 6,690,534 B2 | * | 2/2004 | Ding et al. | 360/77.02 |
| 6,800,864 B2 | * | 10/2004 | Scaman | 250/492.22 |
| 6,831,804 B2 | * | 12/2004 | Ooi et al. | 360/77.07 |
| 7,268,968 B2 | * | 9/2007 | Semba et al. | 360/77.02 |
| 7,486,470 B1 | * | 2/2009 | Semba | 360/77.01 |
| 7,501,783 B2 | * | 3/2009 | Imadu et al. | 318/611 |
| 7,552,645 B2 | * | 6/2009 | Bargatin et al. | 73/777 |
| 7,889,019 B2 | * | 2/2011 | Gizara | 332/109 |
| 8,027,119 B2 | * | 9/2011 | Zhang | 360/77.02 |
| 2003/0095354 A1 | * | 5/2003 | Atsumi et al. | 360/78.06 |
| 2004/0094711 A1 | * | 5/2004 | Lee et al. | 250/306 |
| 2004/0267407 A1 | * | 12/2004 | Ogura et al. | 700/280 |
| 2005/0119795 A1 | * | 6/2005 | Morisada | 700/280 |
| 2005/0126849 A1 | * | 6/2005 | Pearson et al. | 181/209 |
| 2006/0109480 A1 | * | 5/2006 | Hidaka | 356/600 |
| 2006/0186876 A1 | | 8/2006 | Proksch et al. | |
| 2007/0046366 A1 | * | 3/2007 | Hinrichs et al. | 327/552 |
| 2007/0105504 A1 | * | 5/2007 | Vorenkamp et al. | 455/73 |
| 2007/0123199 A1 | * | 5/2007 | Itkin et al. | 455/403 |
| 2008/0049233 A1 | | 2/2008 | De Groot | |
| 2008/0051942 A1 | * | 2/2008 | Smith et al. | 700/280 |
| 2008/0277582 A1 | * | 11/2008 | Shi et al. | 250/309 |
| 2009/0079441 A1 | * | 3/2009 | Cathelin et al. | 324/613 |
| 2009/0262421 A1 | * | 10/2009 | Buican | 359/485 |
| 2010/0007881 A1 | | 1/2010 | Shyu et al. | |

FOREIGN PATENT DOCUMENTS

| | | |
|---|---|---|
| EP | 0 527 601 A1 | 2/1993 |
| EP | 1 653 478 A2 | 5/2006 |
| EP | 1 860 396 A1 | 11/2007 |
| GB | 2 388 914 A | 11/2003 |
| JP | A-04-038504 | 2/1992 |
| JP | A-2002-162219 | 6/2002 |
| JP | A-2007-017706 | 1/2007 |
| WO | WO 01/22409 A1 | 3/2001 |
| WO | WO 2007/101133 A2 | 9/2007 |
| WO | WO 2008/138873 A1 | 11/2008 |

OTHER PUBLICATIONS

Wikipedia, "definition: Resonator", Jul. 31, 2012, pp. 1-5.*
Wikipedia, "definition:Band-stop filter", Aug. 27, 2012, pp. 1-3.*
Mecki et al, "Reducing Residual Vibration in Systems with Uncertain Resonances", 1988, IEEE, pp. 73-76.*
Singer et al, "Preshaping Command Inputs to Reduce System Vibration", Jan. 1988, pp. 26.*
Development of a scanning probe microscope compact sensor head featuring a diamond probe mounted on a quartz tuning fork. Tyrrell et al. Measurement Science and Technology. 2003. vol. 14, pp. 2139-2143.
PZT Components. Piezotechnology. 2009. http://www.piceramic.de/site/picomp_004.html and http://www.piceramic.de/site/picomp_005.html.
Mar. 9, 2012 Office Action issued in U.S. Appl. No. 12/461,810.
European Office Communication issued on Apr. 8, 2011 for European Patent Application No. 08 021 930.6.
Mar. 26, 2009 Search Report issued in EP 08 02 1930, pp. 5.
Jun. 26, 2009 Search Report issued in EP 09 00 0438, pp. 7.
Feb. 25, 2009 Search Report issued in EP 08 01 6297, pp. 8.
Jul. 31, 2008 Search Report issued in EP 08 00 9133, pp. 4.
Jul. 31, 2008 Search Report issued in EP 08 00 9131, pp. 4.
Jun. 14, 2013 Notice of Reasons for Rejection issued in Japanese Patent Application No. 2010-002493 (with translation).
"Input Shaping: A New Control Strategy to Eliminate Residual Vibrations." pp. 1-4. Convolve. New York City, NY.
"Position & Bewegung 25." www.phsikinstrumente.de. pp. 1-8.
A. J. Den Boef. "Scanning Force Microscopy Using a Simple Low-Noise Interferometer." Phillips Research Laboratories. May 19, 1989. The Netherlands. pp. 1-2.
Mar. 26, 2009 Search Report issued in EP 08 02 1930.
Jun. 26, 2009 Search Report issued in EP 09 00 0438.
Feb. 25, 2009 Search Report issued in EP 08 01 6297.
Jul. 31, 2008 Search Report issued in EP 08 00 9133.
Jul. 31, 2008 Search Report issued in EP 08 00 9131.
U.S. Appl. No. 12/461,810, filed Aug. 25, 2009. Hans-Ulrich Danzebrink et al.

* cited by examiner

METHOD OF ACTUATING A SYSTEM, APPARATUS FOR MODIFYING A CONTROL SIGNAL FOR ACTUATION OF A SYSTEM AND METHOD OF TUNING SUCH AN APPARATUS

The present invention generally relates to a method of actuating a system comprising a movable component and an actuator configured to move the movable component, an apparatus for modifying a control signal for actuation of a system comprising a movable component and an actuator configured to move the movable component, and to a method of adjusting such an apparatus.

In modern technology, components having dimensions of the order of magnitude of micrometers or less are employed. Examples of such components include components of micro-electro-mechanical systems (MEMS) and magnetic read/write heads for hard disks. The quality of such components can be influenced by the level of roughness of the surface of the components on length-scales on the order of magnitude of nanometers. In order to assess the quality of the components, it is desirable to perform measurements both on length scales of micrometers and on length scales of nanometers.

Scanning probe microscopy techniques such as atomic force microscopy, scanning tunneling microscopy and optical near field microscopy are able to resolve details having dimensions of the order of magnitude of nanometers. In response to the availability of increasingly robust systems, their industrial application is becoming widespread. The field of view accessible by means of techniques of scanning microscopy, however, is limited by the relatively slow scan speed of scanning microscopes according to the state of the art.

Optical far-field microscopy, on the other hand, allows fast measurements over a relatively large field of view of up to an order of magnitude of millimeters. The resolution of optical far-field microscopy, however, is limited by diffraction. Therefore, features smaller than the wavelength of light can not be resolved by optical far-field microscopy. Therefore, it has been proposed to combine an optical microscope and a scanning microscope into a single instrument.

EP 1653478 A2 discloses an instrument according to the state of the art which will be described with reference to FIG. 1 in the following. The instrument 100 comprises a surface texture measuring probe 160 which is provided between an objective lens 111 of an optical observation unit 110 and a workpiece 101 which is to be investigated by the instrument 100.

In addition to the objective lens 111, the optical observation unit 110 includes a half-mirror 112 arranged on an optical path L1 of the objective lens 111, a camera 113 arranged on the optical path L1 of the objective lens 111 to image light reflected from the workpiece 101 and transmitted through the half-mirror 112 and a light source 114 arranged on an optical axis L2 orthogonal to the optical axis L1 of the objective lens 111 to irradiate the workpiece 101 via the half-mirror 112 and the objective lens 111. The optical observation unit 110 allows an investigation of the workpiece 101 by means of optical far-field microscopy.

The instrument 100 further comprises a near-field measuring unit 130 including an actuator 132 that displaces a holder 131 holding the measuring probe 160 along the optical axis L1, the surface texture measuring probe being arranged integrally with the holder 131 and fixed near the objective lens 111, a half-mirror 134 arranged on the optical axis L1 of the objective lens 111, a laser source 135 arranged on an optical axis L4 orthogonal to the optical axis L1 of the objective lens 111, a half-mirror 136 arranged on the optical axis L1 of the objective lens 111, a mirror 137 arranged on an optical axis L41 orthogonal to the optical axis L4 to reflect the reflected light from the half-mirror 136, a photon detector 138 that receives reflected light from the mirror 137 and a demodulator that demodulates the output signal from the photon detector 138. Additionally, the instrument 100 comprises a drive controller 140 that controls the operation of a relative movement unit 103 to move the workpiece 101 provided on a table 102 such that the surface texture measuring probe 160 is moved along the surface of the workpiece 101.

In the operation of the optical near-field measuring unit 130, light from the laser source 135 is supplied to the measuring probe 160 by the half-mirrors 134, 136 and forms an optical near-field in the vicinity of a measuring tip provided in the measuring probe 160. Light from a measuring tip of the measuring probe 160 is directed to the photon detector 138 by the half-mirrors 134, 136 and the mirror 137. The measuring probe 160 is vibrated such that the distance between the measuring tip and the workpiece 101 is varied in a periodic manner. Since the optical near-field interacts with the workpiece 101 and the interaction between the optical near-field and the workpiece 101 can depend on the distance between the measuring tip and the surface of the workpiece, the intensity of light from the measuring tip received by the photon detector 138 can vary in a periodic manner as the measuring probe 1600 is vibrated.

An output signal from the photon detector 138 is demodulated by the demodulator 139 and input to the drive controller 140. The drive controller 140 controls the operation of the relative movement unit 103 to move the workpiece 101 such that the surface measuring probe 160 is moved along the surface of the workpiece 101, and drives the actuator 132 such that the output of the demodulator 139 becomes constant. Thus, when the movement position along the surface of the workpiece 101 and the amount of motion of the measuring probe 160 caused by the actuator 132 are obtained, the surface texture of the workpiece 101 can be measured.

A problem of the measuring instrument 100 is that if the actuator 132 is operated to move the measuring probe 160 towards the workpiece 101 or away from the workpiece 101, elastic oscillations of the measuring probe 160 in a direction parallel to the optical axis L1 can be excited. Such elastic oscillations can adversely affect a precision of measurements performed by means of the optical near field measuring unit, and may delay a positioning of the measuring probe 160 in the vicinity of the workpiece 101.

Similar problems may occur in other systems wherein a movable component is to be moved in a desired manner by operating an actuator adapted to move the movable component.

It is an object of the present invention to provide a method of actuating a system comprising a movable component and an actuator configured to move the movable component wherein elastic oscillations of the system in response to the operation of the actuator can be reduced.

It is a further object of the present invention to provide an apparatus for modifying a control signal for actuation of a system comprising a movable component and an actuator configured to move the movable component that allows to reduce elastic oscillations of the system in response to the operation of the actuator, and a method of tuning such an apparatus.

A method according to the present invention of actuating a system comprising a movable component and an actuator configured to move the movable component comprises providing a control signal representative of a desired motion of the movable component. The control signal is supplied to one or more resonators. Each of the one or more resonators has a mode of oscillation representative of at least one elastic mode of oscillation of the system. The control signal is modified by subtracting from the control signal one or more signals representative of a response of the one or more resonators to the control signal. The actuator is operated in accordance with the modified control signal.

The one or more resonators can provide a model of the response of the system to an excitation of elastic oscillations of the system by operation of the actuator. By supplying the control signal to the one or more resonators, a response of the system that would be obtained if the control signal were supplied to the actuator without modification can be modeled. By subtracting the modeled response of the system from the control signal, a modified control signal that is adapted to excite elastic oscillations of the system to a less extent than the unmodified control signal can be obtained, since portions of the control signal that would excite elastic modes of oscillations of the system can be reduced or substantially removed. By operating the actuator in accordance with the modified control signal, an excitation of the elastic modes of oscillation of the system and, hence, elastic oscillations of the system in response to the operation of the actuator can be reduced.

In some embodiments, the method further comprises adjusting at least one of an amplitude and a phase of an output signal of each of the resonators to create an adjusted output signal of each of the resonators. The adjusted output signals are subtracted from the control signal to create the modified control signal.

By adjusting the amplitude and/or the phase of the output signals of the resonators, the amplitude and/or phase of the output signal of the resonator can be adapted such that the amplitude and phase of the output signal of the resonator correspond at least approximately to the amplitude and phase of the oscillation of the system that would be obtained if the unmodified control signal were supplied to the actuator. Thus, the modified control signal supplied to the actuator can be approximately inverse to the elastic oscillations of the system that would be obtained if the unmodified control signal were supplied to the actuator. Thus, a more efficient reduction of an excitation of elastic modes of oscillation of the system and, hence, a more efficient reduction of elastic oscillations of the system, can be obtained.

In some embodiments, at least one of the one or more resonators is tuned to have a resonance frequency equal to a resonance frequency of a respective one of the elastic modes of oscillation. In some of these embodiments, at least one of the one or more resonators is tuned to have a Q-factor equal to a Q-factor of a respective one of the elastic modes of oscillation.

By providing one or more resonators, each of which is tuned to have a frequency and/or Q-factor corresponding to that of an elastic mode of oscillation of the system, modes of oscillation of the system which can contribute to the elastic oscillation of the system to a relatively large extent can be modeled, or, in case an individual resonator is provided for each mode of oscillation of the system, all modes of oscillation of the system can be modeled. Thus, a relatively precise modeling of the elastic modes of oscillation of the system can be obtained.

In some embodiments, at least one of the one or more resonators is tuned to have a resonance frequency within a frequency band comprising two or more of the elastic modes of oscillation and to have a bandwidth equal to or greater than a width of the frequency band.

Thus, a contribution of two or more elastic modes of oscillation of the system to the elastic oscillation that would be obtained if the actuator were operated in accordance with the unmodified control signal can be taken into account, at least approximately, by a single resonator. Thus, the number of resonators required to model the elastic response of the system can be reduced. This can help to reduce the complexity of an electric circuit providing the resonators, in particular, if the resonators are provided by analog resonator circuits. Moreover, reducing number of resonators can help to reduce the number of parameters of the system that need to be adjusted for modeling the system. Thus, the tuning of the resonators as well as the adjustment of amplitude and phase of the output signals of the resonators can be simplified.

In some embodiments, the method further comprises measuring at least one of a frequency and a Q-factor of one or more elastic modes of oscillation of the system. The measured frequencies and/or Q-factor of the one or more elastic modes of oscillation of the system can help to tune the one or more resonators such that they are representative of the elastic modes of oscillation of the system. The tuning of the one or more resonators will be described in more detail below.

In some embodiments, operating the actuator in accordance with the modified control signal can comprise low-pass filtering the modified control signal. Thus, high frequency components of the modified control signal can be reduced. This may help to further reduce elastic oscillations of the system, in particular in embodiments wherein the system comprises a plurality of elastic modes of oscillation having a relatively high resonance frequency.

An apparatus for modifying a control signal for actuation of a system comprising a movable component and an actuator for moving the movable component according to the present invention comprises one or more resonators, an input section, a subtractor, and an output section. Each of the one or more resonators is tunable to have a mode of oscillation representative of at least one elastic mode of oscillation of the system. The input section is adapted to receive the control signal and to supply the control signal to the one or more resonators. The subtractor is adapted to create a modified control signal by subtracting from the control signal a signal representative of a response of the one or more resonators to the control signal. The output section is adapted to output the modified control signal.

The one or more resonators of the apparatus allow to model the elastic oscillations of the system that would be obtained if the actuator of the system were operated in accordance with the unmodified control signal. By supplying the control signals to the resonators, and by subtracting from the control signal a signal representative of the response of the one or more resonators to the control signal, which can be done by means of the input section and the subtractor, a modified control signal can be created that is adapted to excite elastic oscillations of the system to a less extent than the original control signal. The output section of the apparatus can be connected to electronic devices such as, for example, an amplifier, for operating the actuator of the system in accordance with the modified control signal.

In some embodiments, each of the one or more resonators comprises an analog resonator circuit.

Analog resonator circuits can be implemented by means of circuit elements such as capacitors, resistors, operational amplifiers and/or coils that can be provided at relatively low cost, and can be tuned by means of relatively cheap tunable elements such as variable resistors, variable capacitors and/or variable inductivities. Thus, a low-cost solution for reducing elastic oscillations of the system can be provided.

In some embodiments, each of the one or more resonators comprises a virtual resonator provided by a digital filter circuit.

A digital filter circuit can allow to provide a relatively large number of virtual resonators by appropriate programming of the digital filter circuit. Hence, digital filter circuits can be particularly advantageous if the system comprises a relatively large number of elastic modes of oscillation in a frequency range wherein the control signal has significant frequency components, and if it is desired to model each of the elastic modes of oscillation of the system by means of an individual resonator. Moreover, the operation of digital filter circuits can be affected to a lower extent by effects such as a thermal drifting of properties of circuit elements, which can affect the precision of analog circuits, or can be substantially unaffected by such effects.

In some embodiments, the apparatus further comprises a regulating section. The regulating section is adapted to receive an output signal from each of the one or more resonators, to adjust at least one of an amplitude and a phase of the output signal and to supply the adjusted output signals to the subtractor.

By means of the regulating section, amplitude and/or phase of the output signals from each of the one or more resonators can be adjusted such that they at least approximately correspond to the amplitude and/or phase of the oscillation of the system in the elastic mode of oscillation represented by the respective resonator. Thus, the modified control signal supplied to the actuator can be at least approximately inverse to the elastic oscillations of the system that would be obtained if the unmodified control signal were supplied to actuator, which can help to obtain a particularly efficient reduction of an excitation of elastic oscillations of the system when the actuator is operated in accordance with the modified control signal.

In some embodiments, each of the one or more resonators comprises means for tuning at least one of a frequency of oscillation and a Q-factor of the resonator. Thus, the one or more resonators can be tuned in such a manner that each resonator has a mode of oscillation representative of at least one elastic mode of oscillation of the system.

In some embodiments, the apparatus can further comprise a low-pass filter connected between the subtractor and the output section, wherein the low-pass filter is adapted to perform a low-pass filtering of the modified control signal.

A method of adjusting the one or more resonators of an apparatus as described above comprises providing a system comprising a movable component and an actuator configured to move the movable component. The actuator is operated in accordance with a predetermined control signal. A motion of at least a portion of the movable component in response to the operation of the actuator is measured. Elastic modes of oscillation of the system are determined on the basis of the measured motion. The one or more resonators are tuned such that each resonator is excitable at a frequency of at least one of the elastic modes of oscillation.

When the actuator is operated in accordance with a predetermined control signal, elastic oscillations of the system can be excited. Since the control signal can have Fourier components whose frequency corresponds to a frequency of an elastic mode of oscillation of the system, the elastic oscillation of the system can comprise contributions of one or more elastic modes of oscillation of the system. The elastic oscillations of the system can lead to a motion of the mobile component. Hence, by measuring the motion of at least a portion of the mobile component, the elastic oscillations of the system can be detected and the elastic modes of oscillations of the system can be established. By tuning the resonators for being excitable at a frequency of at least one of the elastic modes of oscillation, the apparatus can be set up such that it can be used for reducing oscillations of the system as described above.

In some embodiments, at least one of the one or more resonators is tuned to have a resonance frequency equal to a resonance frequency of a respective one of the elastic modes of oscillation. In some embodiments, at least one of the one or more resonators is tuned to have a Q-factor equal to a Q-factor of a respective one of said elastic modes of oscillation. Thus, a particularly precise modeling of the elastic oscillations of the system that would be obtained if the actuator were operated in accordance with the unmodified control signal can be obtained.

In some embodiments, at least one of the one or more resonators is tuned to have a frequency within a frequency band comprising two or more of the elastic modes of oscillation and to have a bandwidth equal to or greater than a width of the frequency band. Thus, two or more of the elastic modes of oscillation of the system can be taken into account by means of a single resonator of the apparatus, which can allow to reduce the number of resonators of the apparatus and to reduce the number of parameters of the apparatus that need to be tuned.

Embodiments of the present invention will be described with reference to the accompanying figures, wherein FIG. 1 shows a schematic cross-sectional view of a measuring instrument according to the state of the art;

Figure 7:
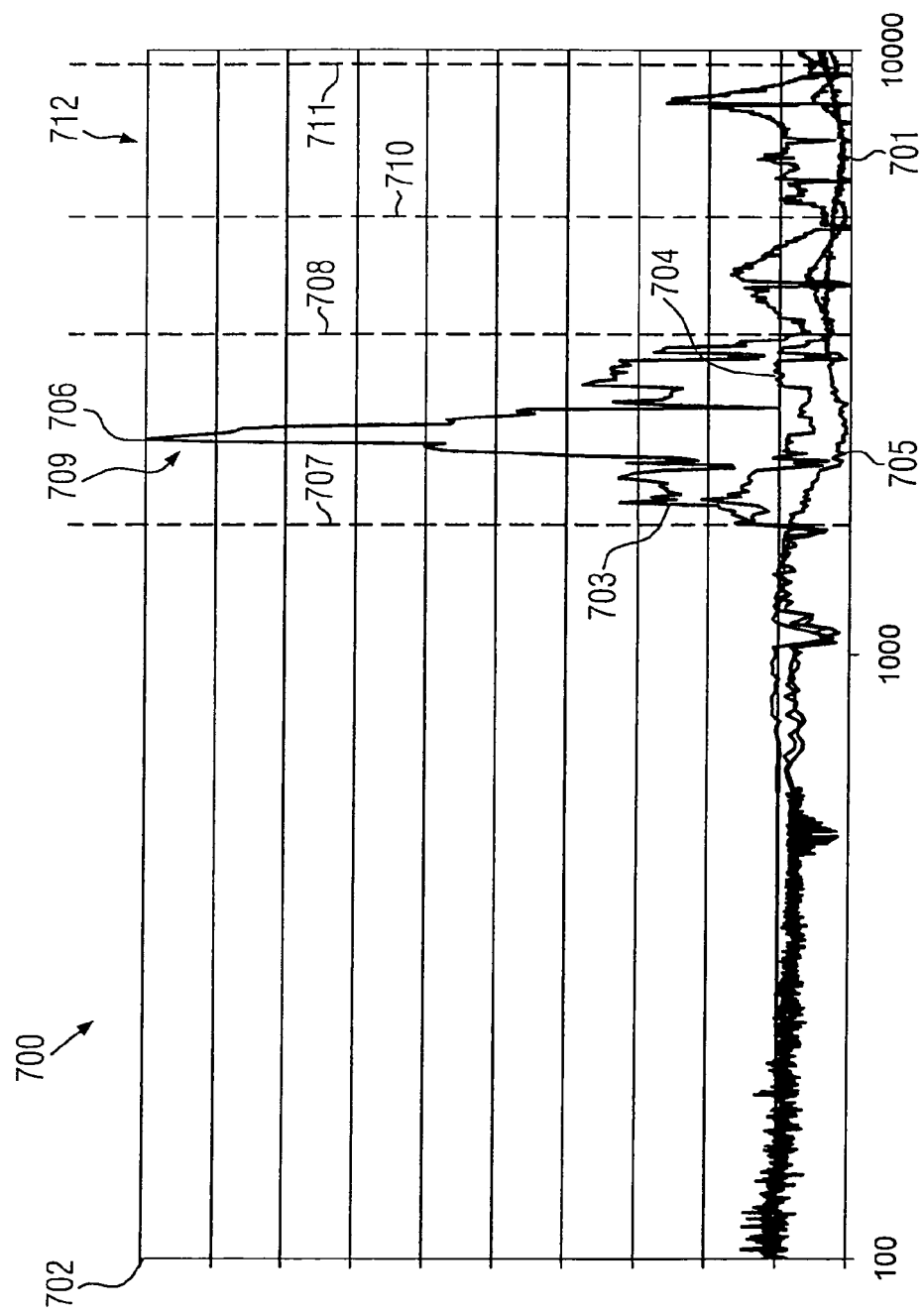
Figure 8:
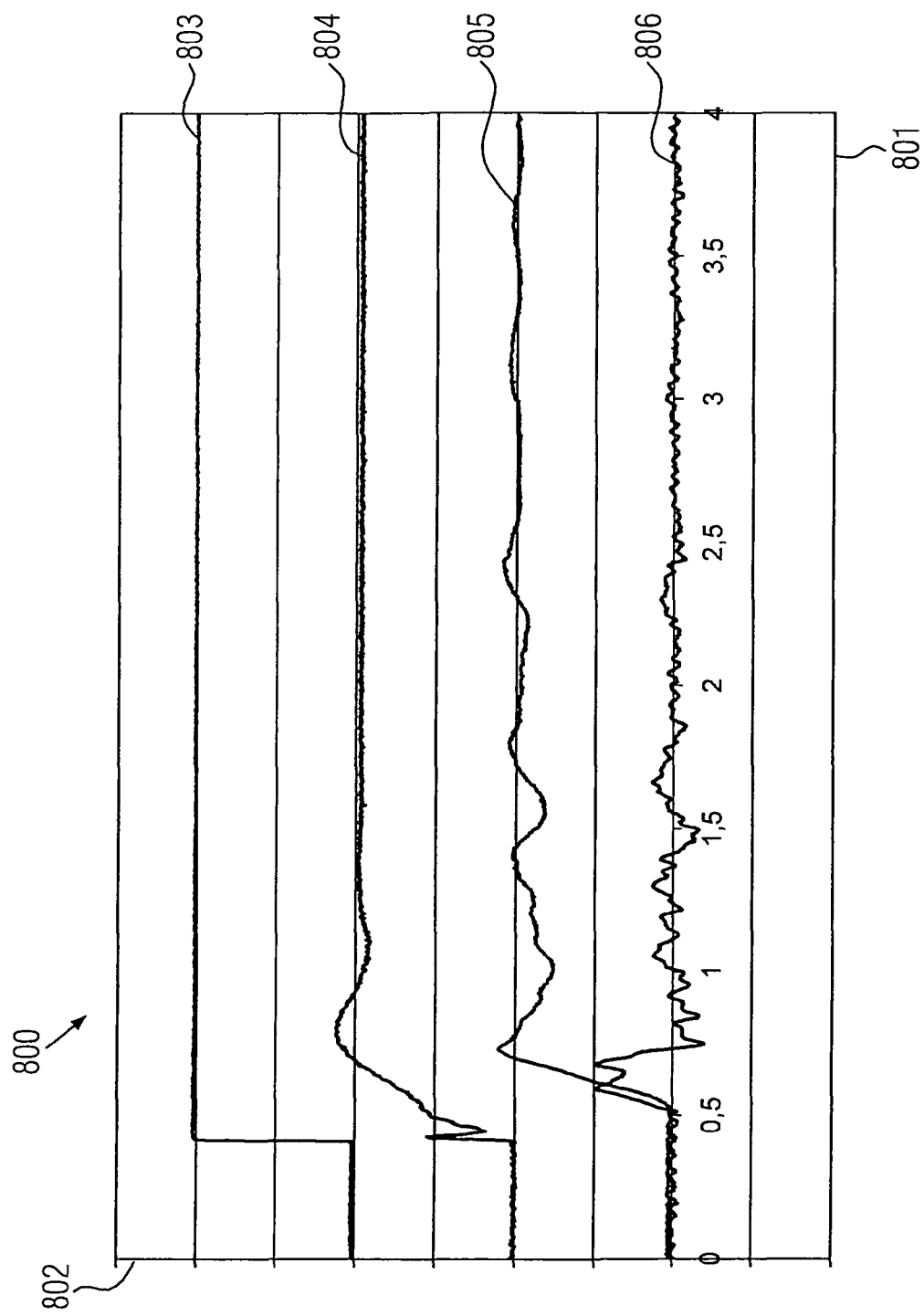

FIG. 7 shows a schematic illustration of frequency spectra of motions of a movable component in a system comprising an actuator operated in accordance with a control signal and in accordance with a control signal modified according to the present invention, and a frequency spectrum of the modification of the control signal; and FIG. 8 shows a schematic illustration of motions of a movable component in a system comprising an actuator operated in accordance with a control signal modified according to the present invention.

Figure 2:
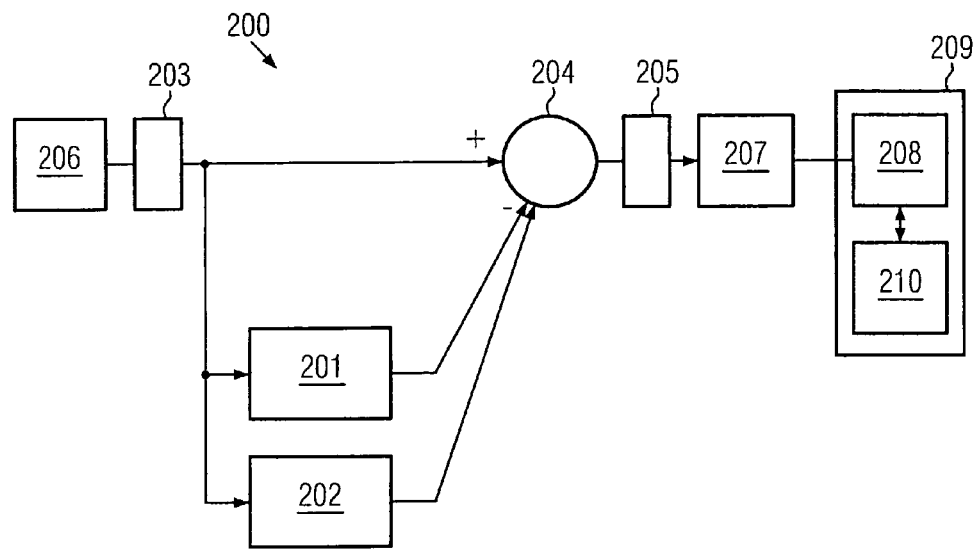
FIG. 2 shows a schematic block diagram of an apparatus according to an embodiment of the present invention.

FIG. 2 shows a schematic block diagram of an apparatus 200 according to an embodiment of the present invention. In some embodiments, the apparatus 200 can be used for modifying a control signal for actuation of a system 209 comprising a movable component 210 and an actuator 208 configured to move the movable component 210.

Figure 1:
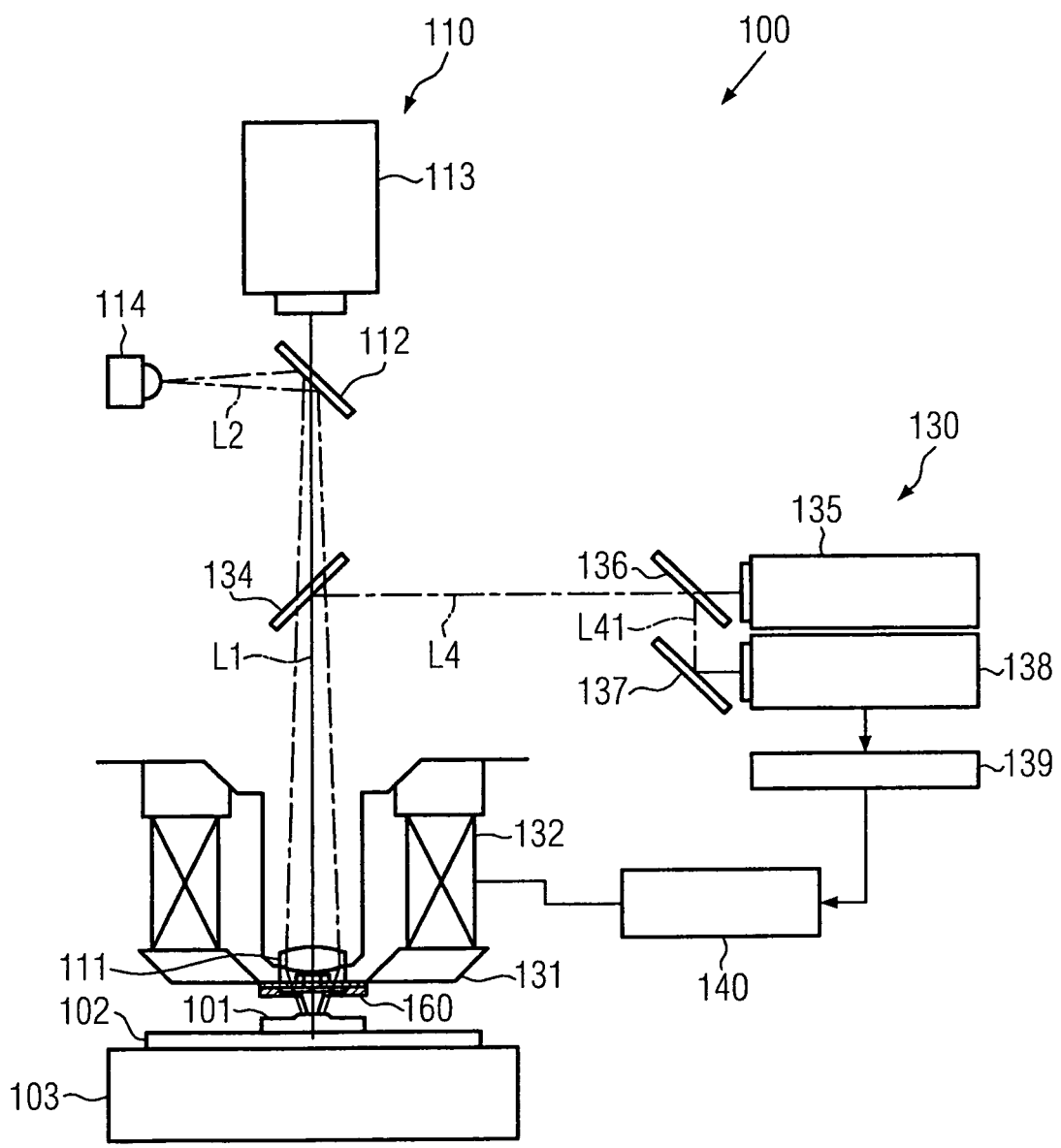

In some embodiments, the system 209 can comprise an instrument 100 as described above with reference to FIG. 1. In such embodiments, the actuator 208 can be the actuator 132 and the mobile component 210 can comprise the holder 131 and the surface texture measuring probe 160 connected thereto.

In some embodiments, the mobile component 210 can comprise a measuring probe comprising an atomic force microscopy cantilever of a type well known to persons skilled in the art instead of a measuring tip adapted for optical near field microscopy. The atomic force measuring probe can be connected to a holder similar to the holder 131 described above for connecting the atomic force measuring probe to the actuator 132. In further embodiments, the measuring probe can have a configuration corresponding to that disclosed in European Patent Application No. 08009133.3 or a configuration corresponding to that disclosed in European Patent Application No. 08009131.7 instead of comprising a conventional atomic force microscopy cantilever. In still further embodiments, the measuring probe can comprise a known scanning tunneling microscopy tip for performing scanning tunneling microscopy instead of atomic force microscopy or optical near field microscopy.

The present invention, however, is not limited to embodiments wherein the system 209 comprises a measuring instrument. Instead, the apparatus 200 can be used also in combination with other systems comprising a mobile component 210 and an actuator 208 configured to move the mobile component.

The apparatus 200 comprises a first resonator 201 and a second resonator 202. Each of the resonators 201, 202 has a mode of oscillation representative of at least one elastic mode of oscillation of a system to be actuated in accordance with a control signal modified by the apparatus 200, as will be explained in more detail below.

The apparatus 200 further comprises an input section 203 adapted to receive a control signal and to supply the control signal to the resonators 201, 202. The input section 203 can be connected to a system controller 206 adapted to provide a control signal representative of a desired motion of the mobile component 210 of the system 209.

In some embodiments, the control signal can be an analog electrical signal. In such embodiments, a voltage of the control signal can be representative of a desired position of the mobile component 210. For example, in embodiments wherein the system 209 comprises an instrument 100 as described above, a voltage of the control signal can be representative of a desired position of the surface texture measuring probe 160, for positioning the surface texture measuring probe 160 at a desired distance to the workpiece 101. In embodiments wherein the control signal is an analog electrical signal, the resonators 201, 202 can be provided in form of analog resonator circuits, as will be explained in more detail below.

In other embodiments, the control signal can be supplied to the input section 203 in form of a digital signal. In some of these embodiments, the input section 203 can comprise a digital-analog converter adapted to convert the control signal into an analog form for supplying the analog control signal to the resonators 201, 202, which can be provided in form of analog resonator circuits. In other embodiments, the apparatus 200 can be configured to process the digital control signal without converting the control signal into an analog signal. In such embodiments, the apparatus 200 can comprise a digital filter circuit, wherein the resonators 201, 202 are provided as virtual resonators and the response of the resonators 201, 202 to the control signal can be determined by means of digital signal processing. The digital filter circuit can comprise a microcontroller or an FPGA programmed with an algorithm for simulating the response of the resonators 201, 202 to the command signal.

In still further embodiments, the input section 203 can be adapted to receive the control signal in form of an analog signal, and can comprise an analog-digital converter adapted to digitize the control signal. The digitized control signal can then be processed by means of a digital filter circuit wherein the resonators 201, 202 are provided as virtual resonators.

The apparatus 200 further comprises a subtractor 204. The subtractor 204 is adapted to create a modified control signal by subtracting from the control signal received by the input section 203 a signal representative of a response of the resonators 201, 202 to the control signal.

In embodiments wherein the control signal comprises an analog electrical signal, or is converted into an analog signal by means of a digital-analog converter, the subtractor 204 can comprise an analog electrical circuit adapted for subtracting analog signals representative of the response of the resonators 201, 202 to the control signal from the control signal. In embodiments wherein the control signal and/or the signals representative of the response of the resonators 201, 202 to the control signal are digital signals or are converted into digital form by means of an analog-digital converter, the subtractor 204 can be adapted to perform the subtraction by means of known digital signal processing techniques.

The apparatus 200 further comprises an output section 205 adapted to output the modified control signal created by the subtractor 204. While in some embodiments, the modified control signal can be output as an analog signal, in other embodiments, the modified control signal can be output in form of a digital signal.

The output section 205 can be adapted to output the modified control signal to means 207 for operating the actuator of the system 209 in accordance with the modified control signal. In embodiments wherein the modified control signal is output as an analog signal, the means 207 can comprise an amplifier. In embodiments wherein the modified output signal is output as a digital signal, the means 207 can comprise a digital-analog converter and an amplifier adapted to amplify the output of the digital analog converter.

The present invention is not limited to embodiments wherein the apparatus 200 comprises two resonators 201, 202 as shown in FIG. 2. In other embodiments, the apparatus 200 can comprise three or more resonators, each being tunable to have a mode of oscillation representative of at least one elastic mode of oscillation of the system 209. In further embodiments, the apparatus 200 can comprise a single resonator.

Figure 3:
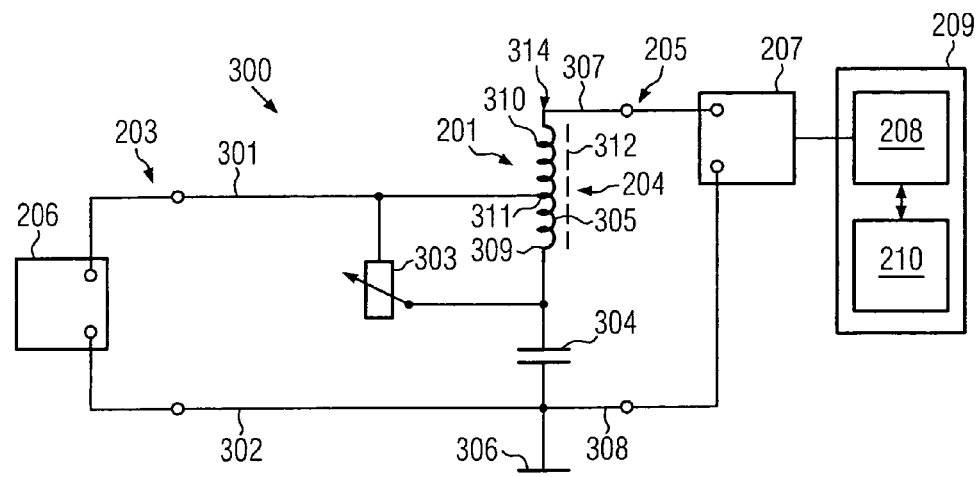
FIG. 3 shows a schematic circuit diagram of an apparatus according to an embodiment of the present invention.

FIG. 3 shows a schematic circuit diagram of an apparatus 300 according to an embodiment of the present invention.

The apparatus 300 can be used for actuating a system 209 comprising a movable component 210 and an actuator 208 configured to move the movable component 210.

The apparatus 300 comprises an input section 203 comprising a first input terminal 301 and a second input terminal 302. The input terminals 301, 302 can be connected to a system controller 206 adapted to apply an analog control signal between the input terminals 301, 302. The second input terminal 302 can be electrically connected to ground.

The apparatus 300 further comprises a resonator 201. The resonator 201 comprises an inductivity provided in form of a first winding 305 of a coil 314, a first terminal 311 of the first winding being connected to the first input terminal 301, a capacitor 304 electrically connected between a second terminal 309 of the first winding 305 and the second input terminal 302 and a resistor 303 electrically connected between the first input terminal 301 and the second terminal 309 of the first winding 305. The first winding 305, the capacitor 304 and the resistor 303 form a damped resonant circuit. Hence, if the control signal applied between the input terminals 301, 302 comprises an AC component, the control signal can excite electrical oscillations of the resonator 201, as will be explained in more detail below.

The apparatus 300 further comprises a subtractor 204 adapted to create a modified control signal by subtracting from the control signal a signal representative of the electrical oscillations of the resonator 201 excited by the control signal. The subtractor 204 comprises a second winding 310 of the coil 314 that is inductively coupled to the first winding 305.

In some embodiments, inductive coupling between the first winding 305 and the second winding 310 of the coil 314 can be provided by a common core 312 of the first winding 305 and the second winding 310. The core 312 can comprise a ferromagnetic material and can extend through the first winding 305 and the second winding 310. In other embodiments, inductive coupling between the first winding 305 and the second winding 305 can be effected by wrapping the first winding 305 and the second winding 310 upon a common coil body which need not comprise a core 312.

The second winding 310 of the coil 310 is electrically connected between a first output terminal 307 and the first terminal 311 of the first winding 305. In some embodiments, the coil 310 can comprise a first terminal, a second terminal and a center tap. In such embodiments, the first terminal of the coil can form the output terminal 307, or can be connected to an electrically conductive line forming the output terminal 307. The center tap can form the first terminal 311 of the first winding 305 and the second terminal of the coil 314 can form the second terminal 306 of the first winding 309.

The apparatus 300 further comprises a second output terminal 308 that is electrically connected to ground and/or the second input terminal 302. The first output terminal 307 and the second output terminal 308 form an output section 205 adapted to output the modified control signal.

If a control signal having an AC component is applied between the input terminals 301, 302, the control signal can excite electrical oscillations of the resonator 201, wherein the capacitor 304 is alternately charged and discharged, and wherein an amperage of an electric current flowing through the first winding 305 increases and decreases alternately. Due to the inductive coupling between the first winding 305 and the second winding 310, the alteration of the electric current flowing through the first winding 305 can induce an electric voltage between the first output terminal 307 and the first terminal 311 of the first winding 305.

According to the law of induction, the electric voltage between the first output terminal 307 and the first terminal 311 of the first winding 305 is approximately proportional to the derivative of the electric current flowing through the first winding 305. The electric current flowing through the first winding 305 is representative of the derivative of the voltage between the terminals of the capacitor 304. Thus, a phase shift of approximately 180 degrees can be obtained between the voltage induced in the second winding 310 and the voltage between the terminals of the capacitor 304.

Since the second winding 310 of the coil 314 and the system controller 206 connected to the input terminals 301, 302 are electrically connected in series between the output terminals 307, 308, a voltage between the output terminals 307, 308 can be approximately equal to a sum of the voltage of the control signal applied between the input terminals 301, 302 and the voltage induced in the second winding 310. Due to the phase shift of approximately 180° between the voltage induced in the second winding 310 and the voltage between the terminals of the capacitor 304, the voltage between the output terminals 307, 308 is representative of a difference between the voltage applied between the input terminals 301, 302 and the voltage between the terminals of the capacitor 304. The voltage between the terminals of the capacitor 304 is representative of a response of the resonator 201 to the control signal. Thus, a subtraction of a signal representative of a response of the resonator 201 to the control signal from the control signal is obtained.

In some embodiments, the number of turns of the first winding 305 and the number of turns of the second winding 310 can be substantially equal. In other embodiments, the number of turns of the first winding 305 and the number of turns of the second winding 310 can be different from each other. The ratio between the number of turns of the second winding 314 and the number of turns of the first winding 305 can have an influence on the amplitude of the signal representative of the response of the resonator 201 to the control signal that is subtracted from the control signal. A greater (smaller) ratio between the number of turns of the second winding 310 and the number of turns of the first winding 305 can lead to a greater (smaller) amplitude of the signal subtracted from the control signal.

The resonator 201 formed by the first winding 305, the capacitor 304 and the resistor 303 can be tuned by varying at least one of the inductance of the first winding 305, the capacity of the capacitor 304 and the resistivity of the resistor. To vary the inductance of the first winding 305, a fraction of the magnetic flux created by a current flowing through the first winding 305 that penetrates the core 312 can be varied, for example by shifting the core 312 or a portion thereof relative to the coil 314. To allow a variation of the capacity of the capacitor 304, the capacitor 304 can comprise a variable capacitor, for example a rotary capacitor or a capacitance diode. To allow a variation of the resistivity of the resistor 303, the resistor 303 can comprise a variable resistor, for example a potentiometer.

The present invention is not limited to embodiments wherein both the inductance of the first winding 305 and the capacity of the capacitor 304 are variable. In some embodiments only one of the inductance of the first winding 305 and the capacity of the capacitor 304 is variable. For example, the inductance of the first winding 305 can be variable and the capacitance of the capacitor 304 can be fixed.

A resonance frequency of the resonator 201 can be tuned by varying at least one of the inductance of the first winding 305 and the capacity of the capacitor 304. Varying the resistivity of the resistor 303 can allow to control a damping of oscillations of the resonator 201 such that a Q-factor of the resonator 201 can be controlled. Thus, frequency and/or Q-factor of the resonator 201 can be tuned such that they are representative of at least one elastic mode of oscillation of the system 209, as will be explained in more detail below.

Further features of the apparatus 300 may correspond to those of the apparatus 200 described above with reference to FIG. 2.

Further embodiments of the present invention will be described with reference to FIG. 4.

Figure 4:
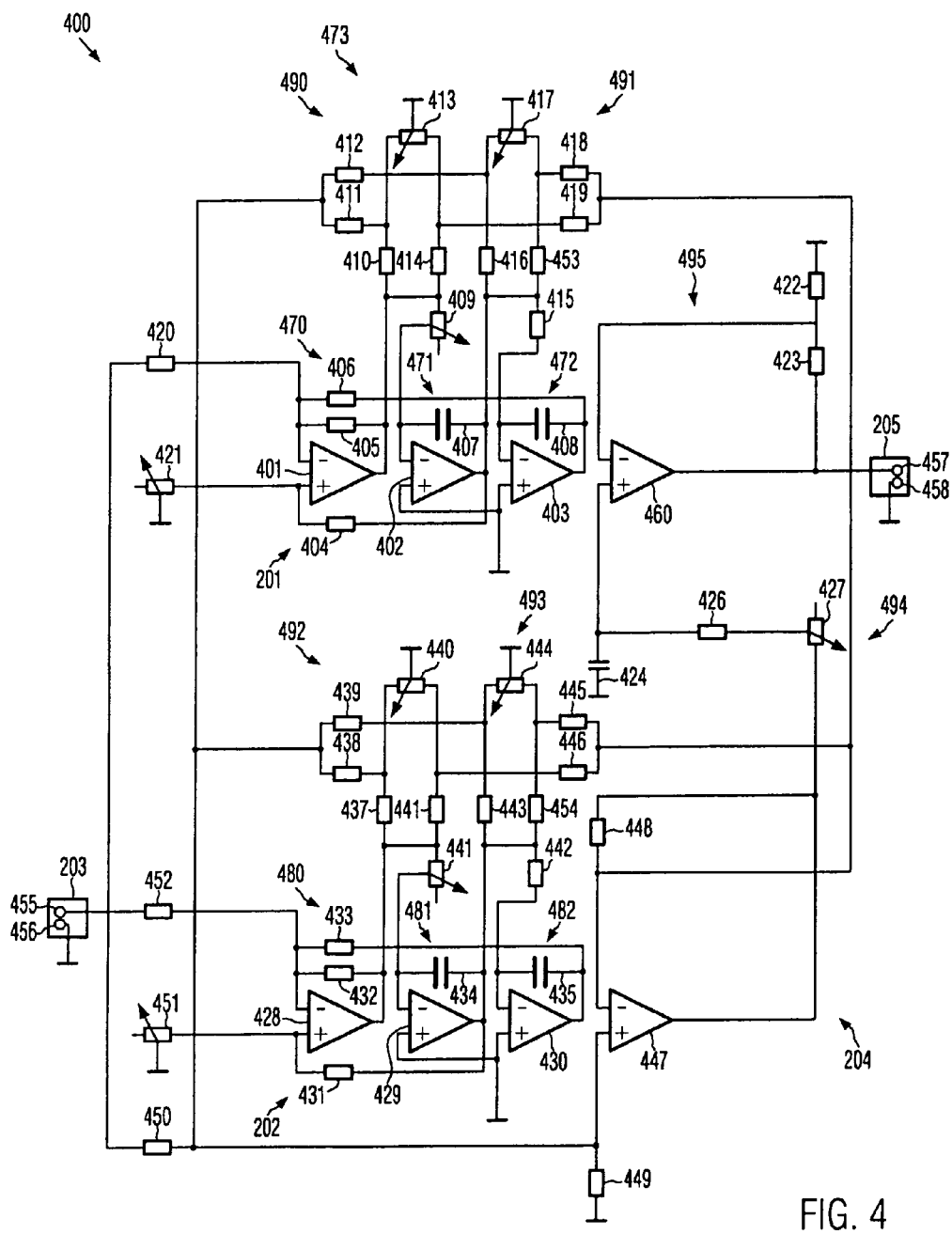
FIG. 4 shows a schematic circuit diagram of an apparatus according to another embodiment of the present invention.

FIG. 4 shows an apparatus 400 for modifying a control signal for actuating a system comprising a movable component and an actuator configured to move the movable component.

The apparatus 400 comprises a first resonator 201 and a second resonator 202, an input section 203, a subtractor 204 and an output section 205.

The input section 203 can comprise a connector comprising a first input terminal 455 and a second input terminal 456 for connecting the apparatus 400 to a system controller adapted to provide an analog control signal, similar to the system controller 206 described above with reference to FIG. 2. The output section 205 can comprise a connector comprising a first output terminal 457 and a second output terminal 458 for connecting the apparatus 400 to an amplifier connected to the actuator of the system to be controlled, similar to the amplifier 207 described above with reference to FIG. 2.

Thus, the actuator can be operated in accordance with a signal output by the output section 205.

The first resonator 201 comprises a differential amplifier 470, a first integrator 471 and a second integrator 472.

The differential amplifier 471 comprises an operational amplifier 401. An inverting input of the operational amplifier 401 is connected to the first input terminal 455 via a resistor 420, and is connected to an output of the second integrator 472 via a resistor 406. A non-inverting input of the operational amplifier 401 is connected to ground via a variable resistor 421, and is connected to an output of the first integrator 471 via a resistor 404. A resistor 405 is connected between the output of the operational amplifier 401 and the inverting input of the operational amplifier 401 to provide feedback.

The resistors 404, 405, 406 can have approximately equal resistivities. In some embodiments, each of the resistors 404, 405, 406 can have a resistivity of approximately 50 kiloohm. The variable resistor 421 can comprise a potentiometer. In some embodiments, the variable resistor 421 can have a resistivity that is variable in a range from approximately zero kiloohm to approximately 100 kiloohm.

The variable resistor 421 and the resistor 404 form a voltage divider, wherein a voltage applied to the non-inverting input of the operational amplifier 401 is approximately equal to $U_{471} R_{404}/(R_{404}+R_{421})$, wherein $R_{404}$ and $R_{421}$ are the resistivities of the resistors 404 and 421, respectively, and wherein $U_{471}$ is an output voltage of the first integrator 471.

In embodiments wherein the resistivities of the resistors 405, 406, 420 are approximately equal, one obtains an output voltage $U_{470}$ of the differential amplifier 470 of approximately $$U_{470} = U_{471}\frac{R_{404}}{R_{404}+R_{421}} - U_{CS} - U_{472} \qquad (1)$$

wherein $U_{CS}$ is the voltage of the command signal applied between the terminals 455, 456 of the input section 203, and $U_{472}$ is the output voltage of the second integrator 471.

The first integrator 471 comprises an operational amplifier 402, a variable resistor 409 that is connected between the output of the differential amplifier 470 and the inverting input of the operational amplifier 402, and a capacitor 407 that is connected between the output of the operational amplifier 402 and the inverting input of the operational amplifier 402. The non-inverting input of the operational amplifier 402 is electrically connected to ground. In some embodiments, the capacitor 407 can have a capacity of approximately 1 nanofarad, and the resistivity of the resistor 409 can be variable in a range from approximately zero kiloohm to approximately 200 kiloohm.

The output voltage $U_{471}$ of the first integrator 471 is approximately equal to $$U_{471} = \frac{1}{R_{409}C_{407}}\int U_{470}dt + \text{const.} \qquad (2)$$

wherein $R_{409}$ is the resistivity of the resistor 409 and $C_{407}$ is the capacity of the capacitor 407.

The second integrator 472 comprises an operational amplifier 403, a resistor 415 connected between the inverting input of the operational amplifier 403 and the output of the first integrator 471 and a capacitor 408 connected between the output of the operational amplifier 403 and the inverting input of the operational amplifier 403. In some embodiments, the capacitor 408 can have a capacity of approximately 1 nanofarad, and the resistor 415 can have a resistivity of approximately 22.1 kiloohm.

The output voltage $U_{472}$ of the second integrator 472 is approximately equal to $$U_{472} = \frac{1}{R_{415}C_{408}}\int U_{471}dt + \text{const.} \qquad (3)$$

wherein $R_{415}$ denotes the resistivity of the resistor 415 and $C_{405}$ denotes the capacitance of the capacitor 408.

Inserting equations (2) and (3) into equation (1), one obtains:

$$\ddot{U}_{470} + 2\gamma\dot{U}_{407} + \omega_0^2 U_{407} = -U_{CS} \qquad (4)$$

wherein $$2\gamma = \frac{R_{404}}{R_{404}+R_{421}}\frac{1}{R_{409}C_{407}} \qquad (5)$$

and $$\omega_0 = \sqrt{\frac{1}{R_{415}C_{408}}\frac{1}{R_{409}C_{407}}} \qquad (6)$$

Hence, the output voltage $U_{407}$ of the differential amplifier 470 is given, at least approximately, by the equation of motion of a damped harmonic resonator excitable by the control signal $U_{CS}$.

Thus, the output voltage $U_{407}$ of the differential amplifier 470 is representative of a response of the first resonator 201 to the control signal $U_{CS}$, and the resonance frequency as well as the damping constant and the Q-factor, respectively, of the first resonator 201 can be tuned by adjusting the variable resistors 409, 421.

Similar to the first resonator 201, the second resonator 202 comprises a differential amplifier 480, a first integrator 481 and a second integrator 482. The differential amplifier 480 comprises an operational amplifier 428, resistors 452, 433, 432, 431 and 451, wherein the resistor 451 can be variable. The first integrator 481 comprises an operational amplifier 429, a variable resistor 436 and a capacitor 434. The second integrator 482 comprises an operational amplifier 430, a resistor 442 and a capacitor 435.

Features of the differential amplifier 480, the first integrator 481 and the second integrator 482 of the second resonator 202 can correspond to those of the differential amplifier 470, the first integrator 471 and the second integrator 472 in the first resonator 201. Hence, the output voltage of the differential amplifier 408 can be representative of a response of the second resonator 202 to the control signal $U_{CS}$, and the output voltage of the differential amplifier 480 can be given by the equation of motion of a damped harmonic resonator whose resonance frequency and Q-factor can be adjusted by varying the resistivities of the variable resistors 451, 436.

In some embodiments, the resistivity of the resistor 442 can be different from the resistivity of the resistor 415. For example, the resistivity of the resistor 442 can be approximately 47.5 kiloohm and the resistivity of the resistor 415 can be approximately 22.1 kiloohm. Resistivities and capacities of the other resistors and the capacitors of the second resonator 202 can be approximately equal to those of corresponding components of the first resonator 201.

By varying the resistivity of the variable resistor 409, the resonance frequency of the first resonator 201 can be varied within a first frequency range. By varying the resistivity of the variable resistor 436, the resonance frequency of the second resonator 202 can be varied within a second frequency range which, due to the different resistivities of the resistors 415, 442, can be different from the first frequency range. Thus, a broader range of frequencies can be covered by the first resonator 201 and the second resonator 202 compared to embodiments wherein all circuit elements of the first resonator 201 and the second resonator 202 are equal.

The subtractor 204 comprises an operational amplifier 447. A resistor 448 provides feedback between the output of the operational amplifier 447 and the inverting input of the operational amplifier 447. Resistors 411, 412, 438, 439 and 450 are connected to the non-inverting input of the operational amplifier 447, wherein the resistor 450 is connected between the non-inverting input of the operational amplifier 447 and the first input terminal 455 of the input section 203. The subtractor 204 further comprises resistors 418, 419, 445, 446 which are connected to the inverting input of the operational amplifier 447. A further resistor 449 is connected between the non-inverting input of the operational amplifier 447 and ground.

In some embodiments, the resistivities of the resistors 449, 450 can be substantially equal. Furthermore, the resistivities of the resistors 411, 412, 438, 439, 448, 418, 419, 445, 446 can be substantially equal. In some embodiments, the resistors 449, 450 can have a resistivity of approximately 20 kiloohm and the resistors 411, 412, 438, 439, 448, 418, 419, 445, 446 can have a resistivity of approximately 10 kiloohm.

An output voltage of the subtractor 204 corresponds to a difference between a sum of the voltage of the control signal applied between the input terminals 455, 456 of the input section 203 and voltages applied to the resistors 411, 412, 438, 439 on the one hand, and a sum of the voltages applied to the resistors 418, 419, 445, 446 on the other hand, wherein the voltages can be weighted with a factor determined by the resistivities of the resistors of the subtractor 204.

In some embodiments, the apparatus 400 can further comprise a regulating section 473 connected to each of the resonators 201, 202, for adjusting an amplitude and a phase of the output signals of the resonators 201, 202.

The regulating section comprises a first balancing circuit 490 and a second balancing circuit 491. The first balancing circuit comprises a potentiometer 413. A tap of the potentiometer 413 is connected to ground. Terminals of the potentiometer 413 are connected to the output of the differential amplifier 470 via resistors 410, 414. The terminal of the potentiometer 413 which is connected to the resistor 410 is additionally connected to the resistor 411 of the subtractor 204. The terminal of the potentiometer 413 connected to the resistor 414 is additionally connected to the resistor 419 of the subtractor 204.

The resistor 410 and the portion of the potentiometer 413 between the terminal connected to the resistor 410 and the tap form a first voltage divider, an output voltage of which is applied to the resistor 411 of the subtractor 204. The resistor 414 and the portion of the potentiometer 413 between the terminal connected to the resistor 414 and the tap form a second voltage divider, an output voltage of which is applied to the resistor 419 of the subtractor 204.

Since the resistor 411 is connected to the non-inverting input of the operational amplifier 447 of the subtractor 204, a fraction of the output voltage of the differential amplifier 470 output by the first voltage divider is added to the command signal, and a fraction of the output voltage of the differential amplifier 470 that is output by the second voltage divider is subtracted from the command signal, since the resistor 419 is connected to the inverting input of the operational amplifier 447. Depending on which fraction of the output voltage of the differential amplifier 470 is greater, a voltage proportional to the output voltage of the differential amplifier 470 can be subtracted from the command signal or added to the command signal.

In some embodiments, the resistors 410, 414 can have a resistivity of approximately 1.5 kiloohm, and the potentiometer 413 can have a total resistivity of approximately 5 kiloohm, which can be divided into two portions by moving the tap.

The second balancing circuit 491 comprises resistors 416, 453 and a potentiometer 417, the tap of which is connected to ground. A portion of the potentiometer 417 between the tap of the potentiometer and a terminal of the potentiometer 417 connected to the resistor 416 form a third voltage divider adapted to apply a fraction of the output voltage of the first integrator 471 to the resistor 412 of the subtractor 204. A portion of the potentiometer 417 between the tap and a terminal of the potentiometer 417 connected to the resistor 453 form a fourth voltage divider, the output voltage of which is applied to the resistor 418 of the subtractor 204. Further features of the second balancing circuit 491 can correspond to those of the first balancing circuit 490. Hence, by adjusting the potentiometer 417, a voltage proportional to the output voltage of the first integrator 402 can be added to or subtracted from the command signal.

The output voltage of the first integrator 471 can have a phase shift of approximately 90 degrees relative to the output voltage of the differential amplifier 470. In Fourier space, the integration performed by the first integrator 471 corresponds to a multiplication with $1/(\omega j)$, wherein $\omega$ denotes angular frequency and j denotes the imaginary unit. Hence, a product of a complex number and the output voltage of the differential amplifier 470 can be subtracted from the command signal applied to the input section 203, wherein amplitude and phase of the complex number can be controlled by adjustment of the potentiometers 413, 417.

The regulating section 473 can further comprise a third balancing circuit 492 and a fourth balancing circuit 493. The third balancing circuit 492 comprises resistors 437, 441 and a potentiometer 440. The fourth balancing circuit 493 comprises resistors 443, 454 and a potentiometer 444. The third balancing circuit 492 is connected to the output of the differential amplifier 480 of the second resonator 202 and the fourth balancing circuit 493 is connected to the first integrator 481 of the second resonator 202. Further features of the third balancing circuit 492 and the fourth balancing circuit 493 can correspond to those of the first balancing circuit 490 and the second balancing circuit 491, respectively.

Hence, a product of a complex number and the output voltage of the differential amplifier 480 of the second resonator 202 can be subtracted from the command signal applied to the input section 203, wherein amplitude and phase of the complex number can be controlled by adjustment of the potentiometers 440, 444.

Thus, the regulating section 473 allows to adjust amplitude and phase of signals representative of responses of the resonators 201, 202 to the command signal before subtracting the signals from the command signal by means of the subtractor 204.

In some embodiments, the apparatus 400 can further comprise a lowpass filter 494 connected to the output of the subtractor 204. The lowpass filter can comprise a variable resistor 427 and a resistor 426 connected in series, and a capacitor 424 connected between a terminal of the resistor 426 distal of the subtractor 204 and ground. In some embodiments, the resistor 426 can have a resistivity of approximately 1 kiloohm and the variable resistor can be adapted to provide a resistivity adjustable in a range from approximately zero kiloohm to approximately 100 kiloohm. The capacitor 424 can have a capacity of approximately 10 nF.

The lowpass filter 494 allows to reduce high-frequency components of the command signal. In some applications, the system 209 may have more significant modes of oscillation than the number of virtual resonators in the unit 400. Then, this lowpass filter can help to further reduce elastic oscillations of the system 209.

In some embodiments, a buffer amplifier 495 can be connected between the output of the lowpass filter 494 and the first output terminal 457 of the output section 205. The second output terminal 458 can be connected to ground. The buffer amplifier 495 can comprise an operational amplifier 460 and resistors 422, 423. The resistor 423 can be connected between the output of the operational amplifier 460 and the inverting input thereof, thus providing feedback, and the resistor 422 can be connected between the inverting input of the operational amplifier 460 and ground. The non-inverting input of the operational amplifier 460 can be connected to the lowpass filter 494. In some embodiments, the resistivity of the resistor 422 can be substantially infinite and the resistivity of the resistor 423 can be approximately zero. In some of these embodiments, the resistor 422 can be omitted and the resistor 423 can be provided in form of an electrically conductive line. Thus, the buffer amplifier 495 can be a non-inverting amplifier having a gain approximately equal to one. The buffer amplifier 495 can help to reduce an output impedance of the apparatus 400. In other embodiments, the resistors 422, 423 have finite values of resistivity. In such cases, the buffer amplifier 495 can be a non-inverting amplifier that can adapt to different signal levels of the actuator 208. In such embodiments, each of the resistors 422, 423 can have a resistivity of approximately 10 kiloohm.

The present invention is not limited to embodiments wherein the apparatus 400 comprises the lowpass filter 494 and the buffer amplifier 495. In other embodiments, one or both of the lowpass filter 494 and the buffer amplifier 495 can be omitted.

The present invention is not limited to the embodiments wherein the apparatus 400 comprises the regulating section 473 described above. In some embodiments, the regulating section 473 can be omitted, and the output of the differential amplifier 470 can be connected to one of the resistors 418, 419 of the subtractor 204. The other of the resistors 418, 419 and the resistors 412, 419 can be omitted in such embodiments. Similarly, the output of the differential amplifier 480 can be connected to one of the resistors 445, 446 of the subtractor 204. The other of the resistors 445, 446, and the resistors 438, 439 can be omitted. Thus, a simpler configuration of the apparatus 400 can be obtained.

In further embodiments, the apparatus 400 can comprise a regulating section having a simpler configuration than the regulating section 473 described above. For example, in some embodiments, the second balancing circuit 491 and the fourth balancing circuit 493, as well as the resistors 412, 418, 439, 445 can be omitted. In such embodiments, the regulating section of the apparatus 400 can comprise the first balancing circuit 490 and the third balancing circuit 492. Thus, the amplitudes of the signals representative of the response of the first resonator 201 and the second resonator 202 to the command signal which are subtracted from the command signal can be controlled by means of the balancing circuits 490, 491, whereas an adjustment of the phases of the signals representative of the responses of the resonators 201, 202 can be omitted.

Furthermore, the present invention is not limited to embodiments wherein the apparatus 400 comprises two resonators 201, 202. In some embodiments, one of the resonators 201, 202 can be omitted. In further embodiments, three or more resonators, each having a configuration similar to that of the resonators 201, 202, as well as balancing circuits similar to the balancing circuits 490, 491, 492, 493 for adjustment of the amplitude and phase of the signals representative of the responses of the resonators to the command signal can be provided.

Further features of the apparatus 400 can correspond to those of the apparatus 200 described above with reference to FIG. 2.

Figure 5:
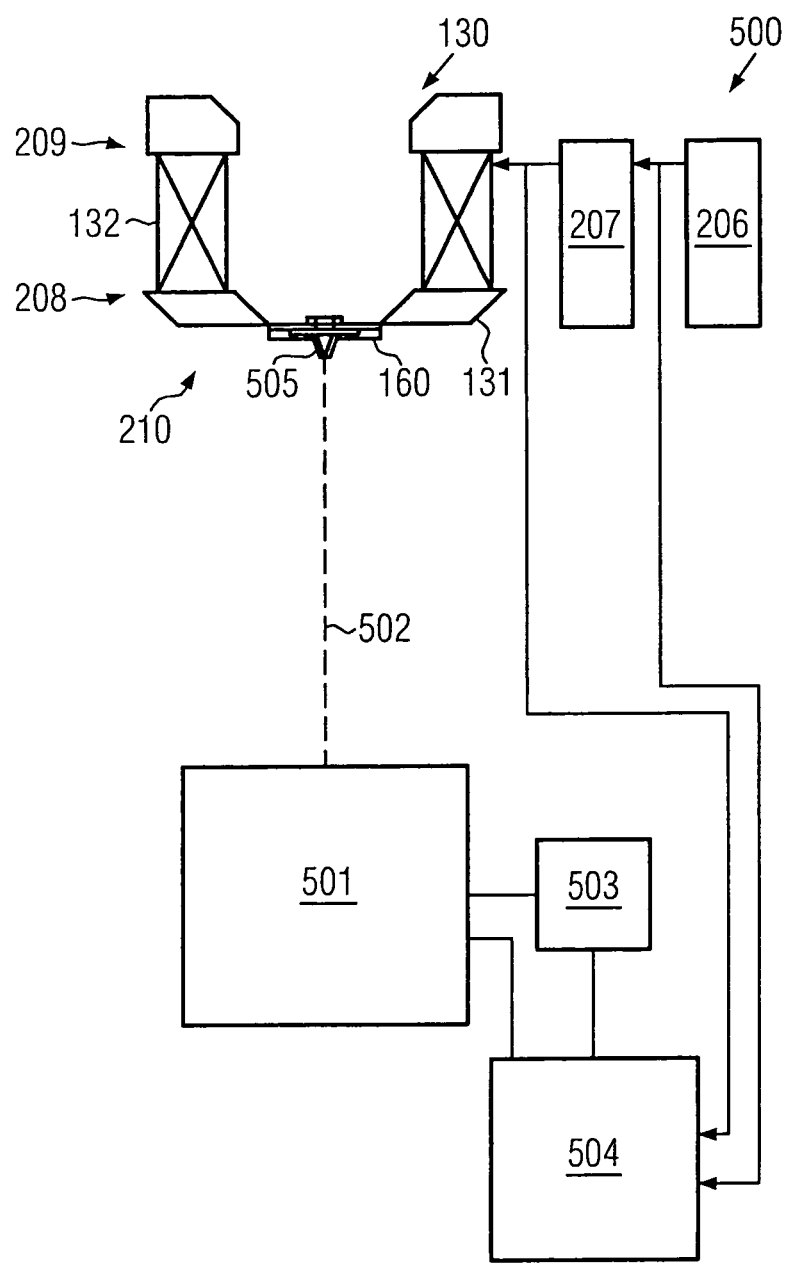
FIG. 5 shows a schematic view of an arrangement that can be used for adjusting an apparatus according to the present invention.

FIG. 5 shows a schematic view of an arrangement 500 that can be used for adjusting an apparatus according to the present invention. The arrangement 500 can, for example, be used for adjusting the apparatuses 200, 300 and 400 described above with reference to FIGS. 2, 3 and 4.

The arrangement 500 comprises a system 209 comprising a mobile component 210 and an actuator 208 configured to move the mobile component 208. In some embodiments, the system 209 can comprise a near-field measuring unit 130 of an instrument 100 as described above with reference to FIG. 1. The actuator 208 can be provided in form of the actuator 132 of the near-field measuring unit 130, and the mobile component 210 can comprise the holder 131 and the measuring probe 160. In other embodiments, the measuring probe 160 need not comprise a near-field measuring unit. For example, the measuring probe 160 can be adapted for performing atomic force microscopy or scanning tunneling microscopy, as described above.

The arrangement 500 further comprises a system controller 206 adapted to provide a command signal, and an amplifier 207 adapted to amplify the command signal provided by the system controller 206 for operation of the actuator 132 in accordance with the command signal provided by the system controller 206. In embodiments wherein the system controller 206 provides the command signal in form of an analog signal, wherein a voltage of the command signal is representative of a desired motion of the mobile component 210, the amplifier 207 can be configured to amplify the voltage of the command signal such that the voltage range of the amplified command signal matches the range of operation of the actuator 132, which can, for example, be a piezoelectric actuator requiring a moderately large voltage of operation. Moreover, the output of the amplifier 207 can have a smaller impedance than the output of the system controller 206.

The arrangement 500 further comprises a vibrometer 501 adapted to measure a motion of at least a portion of the movable component 210 in response to the operation of the actuator 132. For example, the vibrometer 501 can be adapted to measure a motion of a measuring tip 505 of the measuring probe. In some embodiments, the vibrometer 501 can be adapted to direct a light beam 502 to the portion of the movable component 210 whose motion is to be measured, and to determine motions of the portion of the movable component 210 from light reflected therefrom.

In some embodiments, the vibrometer 501 can comprise a known laser vibrometer, for example a sensor head OFV-503 and a controller OFV-5000 equipped with a velocity decoder VD-01 available from Polytec GmbH, Waldbronn, Germany.

In some embodiments, the vibrometer 501 can be adapted to output a signal representative of a velocity of the portion of the movable component whose motion is measured. In such embodiments, the output signal of the vibrometer 501 can be supplied to an integrator 503 to create a signal representative of a position of the portion of the mobile component 210.

The arrangement 500 further comprises an analyzer 504 adapted to analyze at least one of the output signal of the integrator 503, the output signal of the vibrometer 501, the command signal provided by the system controller 206, and the output voltage of the amplifier 207. In some embodiments, the analyzer 504 can comprise a digital oscilloscope. The digital oscilloscope can be configured to perform a Fourier transform of the output signal of the integrator 206, and can also be configured to perform a Fourier transform of the command signal and the output voltage of the amplifier 207. Thus, frequency spectra of the command signal, the output voltage of the amplifier 207 and the output signal of the integrator 206, which is representative of the motion of a portion of the mobile component 210, can be obtained. Additionally, the digital oscilloscope can be configured to display curves representative of the temporal development of the control signal, the output voltage of the amplifier 207 and the position and/or velocity of the mobile component 210.

To adjust the resonators 201, 202 of an apparatus 200, 300, 400 as described above with reference to FIGS. 2, 3 and 4, a predetermined control signal can be provided. In some embodiments, the control signal can comprise a rectangular signal representative of a desired motion of the mobile component by a step of a desired distance. For example, the rectangular signal can be representative of a motion of the measuring probe 160 by a desired distance towards the bottom of FIG. 2, which might be performed in the use of the measuring instrument 100 to approach the measuring probe 160 to the surface of the sample 101. The present invention, however, is not limited to embodiments wherein the control signal is a rectangular signal. In other embodiments, the control signal may have a different shape.

The actuator 132 is operated in accordance with the control signal. This can be done by supplying the control signal to the amplifier 207, and a motion of the mobile component 210 or a component thereof in response to the operation of the actuator 132 is measured.

Figure 6:
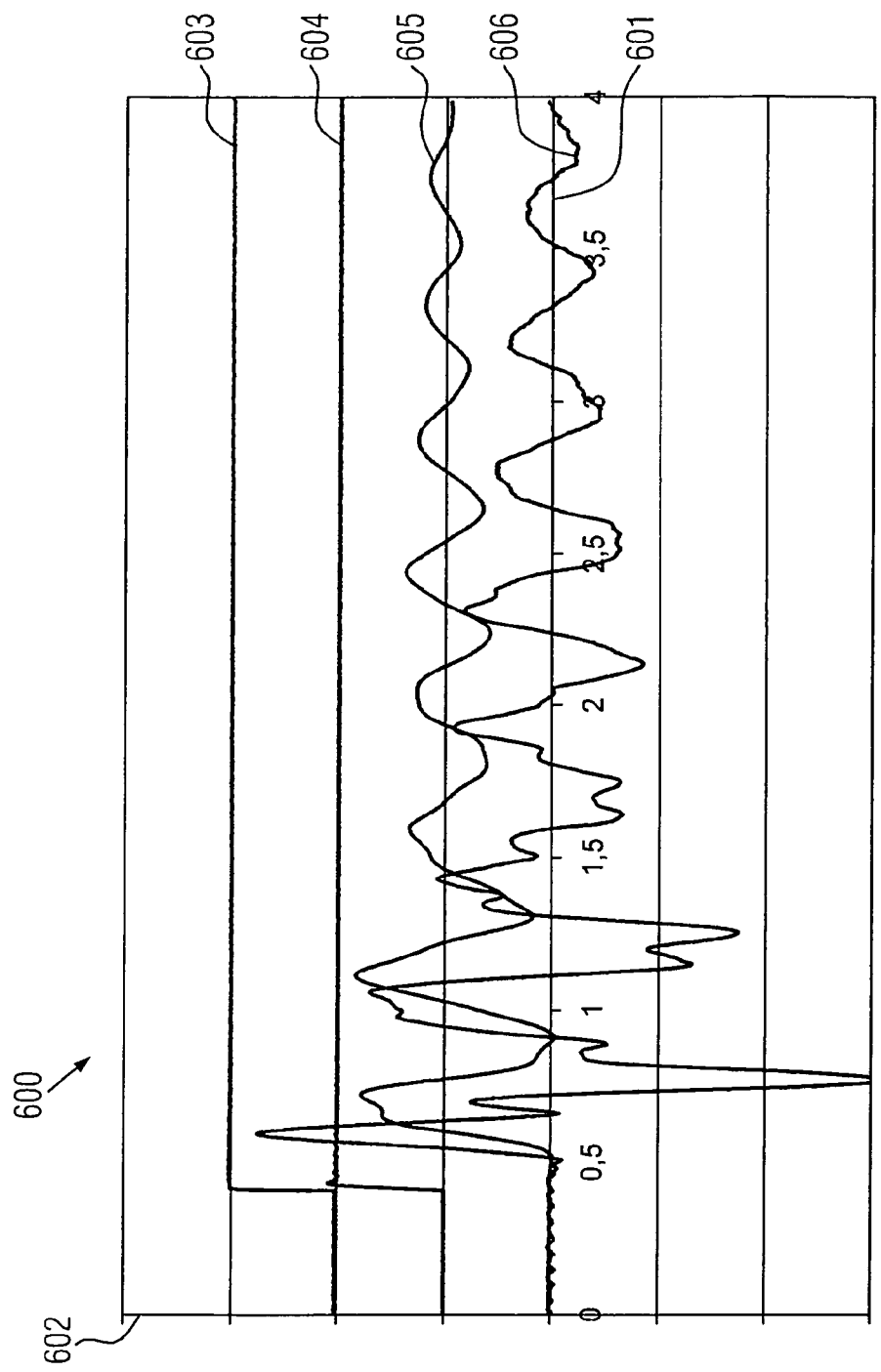
FIG. 6 shows a schematic illustration of motions of a movable component in a system comprising an actuator operated in accordance with a control signal.

FIG. 6 shows a schematic diagram showing curves representing the temporal development of the command signal (curve 603), the output signal of the amplifier 207 (curve 604), the position of the measuring tip 505 (curve 605) and the speed of the measuring tip (curve 606). A horizontal coordinate axis 601 represents time, measured in the unit milliseconds, and a vertical coordinate axis 602 represents the above-noted quantities. For facility of inspection, some of the curves 603-606 have been shifted relative to each other in the direction of the coordinate axis 602, and have been rescaled.

The curve 603 denoting the command signal comprises a step, corresponding to a desired change of the position of the measuring tip 505. Since the command signal is supplied to the amplifier 207 without being modified, the curve 604 representing the output of the amplifier 207 supplied to the actuator 132 is similar to the curve 603 representing the command signal.

When the output of the amplifier 207 is supplied to the actuator 132, at the time of the step of the command signal, the mobile component 210, in particular the measuring tip 505, may be subject to a relatively large acceleration, since the step of the command signal corresponds to a sudden change of the position of the mobile component. The acceleration of the mobile component 210 can excite elastic oscillations of the movable component 210, as can be seen from the curves 605, 606 illustrating position and velocity of the measuring tip 505, respectively. The elastic oscillations may comprise a superposition of one or more elastic eigenmodes of oscillation of the system 209, which can have different frequencies, amplitudes, phases and damping properties. While the motion of the measuring tip 505 that would be obtained if only one elastic mode of oscillation of the system were excited can approximately correspond to a damped sinusoidal oscillation, the superposition of two or more elastic modes of oscillation can create non-sinusoidal elastic oscillations, as schematically shown in FIG. 6.

In FIG. 7, a curve 703 schematically illustrates a spectrum of the elastic oscillations of the measuring tip 505, that can be obtained by Fourier transformation of the curve 605 shown in FIG. 6. A horizontal coordinate axis 701 denotes frequency in the unit Hertz, wherein a logarithmic scale is used. A vertical coordinate axis 702 denotes amplitude. Curve 704 shows a spectrum of elastic oscillations of the system 209 which are obtained if a suitably tuned apparatus according to the present invention is connected between the system controller 206 and the amplifier 207. Curve 705 illustrates a ratio between an amplitude of a signal output by a suitably tuned apparatus according to the present invention and an amplitude of a signal input into the apparatus as a function of frequency. Curves 704, 705 will be explained in more detail below.

The spectrum 703 of the elastic oscillations of the system 709 need not be obtained by Fourier transformation of elastic oscillations obtained in response to a rectangular command signal comprising a step. In other embodiments, the actuator 132 can be operated in accordance with a sinusoidal control signal, and the amplitude of elastic oscillations of the measuring tip 505 can be measured as a function of the frequency of the sinusoidal control signal. This can help to obtain a greater precision of the spectrum 705.

The spectrum 703 comprises a plurality of peaks. Each of the peaks corresponds to one elastic eigenmode of oscillation of the system 209. The position of the peak along the coordinate axis 702 corresponds to the frequency of the respective elastic mode of oscillation of the system, and a full width at half maximum of the peak is representative of a Q-factor of the respective elastic mode of oscillation. For example, peak 706 represents an elastic mode of oscillation having a resonance frequency of approximately 2 kilohertz and a Q-factor of approximately 10. Hence, resonance frequencies and Q-factors of the elastic modes of oscillation of the system 209 can be determined from the curve 709.

The elastic modes of oscillation of the system 209 are structural features of the system 209. They may depend, for example, on dimensions, shape, mass distribution, and materials of the system 209. Hence, as long as the system 209 remains substantially unchanged, or is changed to a small extent only, properties of the elastic modes of oscillation of the system 209 such as frequency and Q-factor can remain substantially constant.

On the basis of the determined elastic modes of oscillation of the system 209, the resonators 201, 202 of an apparatus 200, 300, 400 according to the present invention can be tuned such that each of the resonators 201, 202 has a mode of oscillation representative of at least one elastic mode of oscillation of the system 209.

In embodiments wherein the apparatus comprises the features of the apparatus 300 described above with reference to FIG. 3, the resonator 201 of the apparatus 300 can be tuned by varying the resistivity of the resistor 303, the inductivity of the first winding 305 of the coil 314 and/or the capacity of the capacitor 304. In embodiments wherein the apparatus comprises the features of the apparatus 400 described above with reference to FIG. 4, the resonators 201, 202 can be tuned by varying the resistivities of the variable resistors 409, 421, 436, 451. In embodiments wherein the apparatus comprises a digital filter circuit, as described above with reference to FIG. 2, the resonators 201, 202 provided in form of virtual resonators of the digital filter circuit can be tuned by appropriate programming of the digital filter circuit.

In some embodiments, each of the resonators 201, 202 can be tuned such that the resonance frequency of each of the resonators 201, 202 is approximately equal to the frequency of an elastic mode of oscillation of the system 209, and the Q-factor of each of the resonators 201, 202 is approximately equal to the Q-factor of the respective elastic mode of oscillation of the system 209.

In some embodiments, one or more of the resonators 201, 202 can be tuned such that each of the one or more resonators has a resonance frequency within a frequency band comprising two or more elastic modes of oscillation and a bandwidth equal to or greater than a width of the frequency band.

For example, in FIG. 7, the curve 703 comprises a plurality of peaks adjacent the peak 706, within a frequency band 709 whose boundaries are indicated by dashed lines 707, 708. One of the resonators 201, 202, for example the resonator 201, can be tuned such that it has a frequency within the frequency band 709. For example, the resonance frequency of the resonator 201 can be tuned such that it is approximately equal to the frequency of the peak 706. The Q-factor of the resonator 201 can be tuned such that the bandwidth of the resonator 201 is greater than the width of the frequency band 709. As persons skilled in the art know, the bandwidth of a resonator can be inversely proportional to the Q-factor of the resonator. Hence, the bandwidth of the resonator 201 can be increased by reducing the Q-factor of the resonator, and can be reduced by increasing the Q-factor of the resonator.

The curve 703 further comprises a plurality of peaks corresponding to elastic modes of oscillation of the system 209 in a frequency band 712 whose boundaries are indicated by dashed lines 710, 712. One of the resonators 201, 202, for example the resonator 202, can be adjusted such that it has a resonance frequency within the frequency band 712 and a bandwidth being greater than the width of the frequency band 712.

In some embodiments, one of more of the elastic modes of oscillation of the system 209, for example elastic modes of oscillation having a relatively large amplitude, can be taken into account by adjusting resonators of the apparatus 200, 300, 400 such that a frequency and a Q-factor of each of the resonators are approximately equal to resonance frequency and Q-factor of one of the one or more elastic modes of oscillation. Further elastic modes of oscillation, for example modes of oscillation having a relatively small amplitude, can be taken into account by tuning other resonators of the apparatus 200, 300, 400 in such a manner that each resonator has a frequency within a frequency band comprising two or more elastic modes of oscillation and a bandwidth greater than the bandwidth of the frequency band. Thus, the number of resonators of the apparatus 200, 300, 400 can be reduced compared to embodiments wherein each elastic mode of oscillation of the system 209 is represented by an individual resonator, while particularly pronounced elastic modes of oscillation of the system 209 can precisely be taken into account by modeling them with an individual resonator.

In addition to frequency and Q-factor of the resonators 201, 202, amplitude and/or phase of output signals of the resonators 201, 202 can be tuned. In the apparatus 400 described above with reference to FIG. 4, this can be done by adjusting the potentiometers 413, 417, 440, 444 of the regulating section 473. In embodiments wherein the resonators 201, 202 are provided in form of virtual resonators provided by a digital filter circuit, this can be done by adjusting parameters of the digital filter.

To adjust the amplitude and/or phase of the output signals of the resonators 201, 202, the apparatus 200, 400 according to the present invention can be connected between the system controller 206 and the amplifier 207, and the spectrum of the motion of the movable component 210 that is obtained when a command signal is supplied to the apparatus 200, 400 and the output signal of the apparatus 200, 400 is supplied to the amplifier 207 can be displayed, for example by means of the analyzer 504. Thereafter, the amplitudes and phases of the output signals of the resonators 201, 202 can be tuned in such a manner that a height of peaks of the spectrum is reduced.

In FIG. 7, curve 705 shows a ratio between amplitudes of frequency components of a signal output by an apparatus 400 having a configuration as described above with reference to FIG. 4, and amplitudes of frequency components of a command signal input into the apparatus 400. Frequency and Q-factors of the resonators 201, 202 as well as amplitude and phase of the output signals of the resonators 201, 202 were tuned in such a manner that one of the resonators 201, 202 is excitable by frequencies within the frequency band 709 and the other one of the resonators 201, 202 is excitable by frequencies within the frequency band 712. The curve 705 has minima at the location of the frequency bands 709, 712, which are representative of a suppression of frequencies of the command signal within the frequency bands 709, 712.

Curve 706 in FIG. 7 shows a frequency spectrum of the motion of the measuring tip 505 obtained after operation of the actuator 132 in accordance with a command signal modified by the apparatus 400. Compared to the curve 706, the amplitude of peaks representative of elastic modes of oscillation of the system 209 has been reduced, indicating a reduced excitation of elastic oscillations of the system 209.

FIG. 8 shows a schematic diagram 800 showing curves representing the temporal development of the command signal (curve 803), the output signal of the amplifier 207 (curve 804), the position of the measuring tip 505 (curve 805) and the speed of the measuring tip (curve 806) obtained in an embodiment wherein the command signal is modified in accordance with the apparatus 400 before supplying the command signal to the actuator 132. A horizontal coordinate axis 801 represents time, measured in the unit milliseconds, and a vertical coordinate axis 802 represents the above-identified coordinates. For facility of inspection, some of the curves 803-806 have been shifted relative to each other in the direction of the coordinate axis 802, and have been rescaled.

Similar to the curve 603 shown in FIG. 6, the curve 803 indicates that the command signal comprises a step, corresponding to a desired motion of the movable component by a predetermined distance. Due to the modification of the command signal by the apparatus 400, the shape of the curve 804 illustrating the signal supplied to the actuator 132 differs from the shape of the command signal. Comparison of the curves 805, 806 with the curves 605, 606 shows that oscillations of the system 209 can be suppressed by use of the apparatus 400, and that the movable component 210 more quickly approaches the desired position than in the absence of the apparatus 400. More specifically, by means of the apparatus 400, the desired position of the movable component 210 can be reached within ±20% after 270 μs, and can be reached within ±5% after 1.7 ms.

Hence, the apparatus 400 allows to improve a precision of a positioning of the movable component 210 of the system 209 in a feed-forward configuration without there being a need for a feedback loop.

Similar results can be obtained if an apparatus according to other embodiments of the present invention, for example the apparatus 300 described above with reference to FIG. 4, or a digital filter circuit as described above with reference to FIG. 2, is used instead of the apparatus 400 described above with reference to FIG. 4.

The invention claimed is:

1. A method of actuating a system comprising a movable component and an actuator configured to move said movable component, comprising:
   providing a control signal representative of a desired motion of said movable component;
   supplying said control signal to one or more resonators, each of said one or more resonators having a mode of oscillation representative of at least one elastic mode of oscillation of said system, at least one first resonator of said one or more resonators being tuned to have a resonance frequency within a frequency band comprising two or more of said elastic modes of oscillation and to have a bandwidth equal to or greater than a width of said frequency band;
   modifying said control signal by subtracting from said control signal one or more signals representative of a response of said one or more resonators to said control signal; and
   operating said actuator in accordance with said modified control signal.

2. A method as in claim 1, wherein said control signal is supplied to two or more resonators, and
   wherein at least one second resonator of said two or more resonators is tuned to have a resonance frequency equal to a resonance frequency of a respective one of said elastic modes of oscillation.

3. A method as in claim 2, wherein at least one of said at least one second resonator is tuned to have a Q-factor equal to a Q-factor of a respective one of said elastic modes of oscillation.

4. A method as in claim 1, further comprising measuring at least one of a frequency and a Q-factor of one or more elastic modes of oscillation of said system.

5. A method as in claim 1, further comprising adjusting an amplitude and a phase of an output signal of each of said one or more resonators to create an adjusted output signal of each of said one or more resonators and subtracting said adjusted output signals from said control signal to create said modified control signal.

6. An apparatus for modifying a control signal for actuation of a system comprising a movable component and an actuator configured to move said movable component, said apparatus comprising:
   one or more resonators, each of said one or more resonators being tunable to have a mode of oscillation representative of at least one elastic mode of oscillation of said system, at least one of said one or more resonators being tuned to have a resonance frequency within a frequency band comprising two or more of said elastic modes of oscillation and to have a bandwidth equal to or greater than a width of said frequency band;
   an input section adapted to receive said control signal and to supply said control signal to said one or more resonators;
   a subtractor adapted to create a modified control signal by subtracting from said control signal one or more signals representative of a response of said one or more resonators to said control signal; and
   an output section adapted to output said modified control signal.

7. An apparatus as in claim 6, wherein each of said one or more resonators comprises an analog resonator circuit.

8. An apparatus as in claim 6, wherein each of said one or more resonators comprises a virtual resonator provided by a digital filter circuit.

9. An apparatus according to claim 6, wherein each of said one or more resonators comprises means for tuning at least one of a frequency of oscillation and a Q-factor of said resonator.

10. An apparatus as in claim 6, further comprising a regulation section adapted to receive an output signal from each of said one or more resonators, the regulating section being adapted to adjust an amplitude and a phase of said output signal and to supply said adjusted output signals to said subtractor.

11. A method of adjusting the one or more resonators of an apparatus according to claim 6, comprising:
    providing a system comprising a movable component and an actuator configured to move said movable component;
    operating said actuator in accordance with a predetermined control signal;
    measuring a motion of at least a portion of said movable component in response to said operation of said actuator;
    determining elastic modes of oscillation of said system on the basis of said measured motion;
    tuning said one or more resonators such that each resonator is excitable at a frequency of at least one of said determined elastic modes of oscillation of said system,
    wherein at least one first resonator of said one or more resonators is tuned to have a frequency within a frequency band comprising two or more of said determined elastic modes of oscillation and to have a bandwidth equal to or greater than a width of said frequency band.

12. A method as in claim 11, wherein said apparatus comprises two or more resonators, and
    wherein at least one second resonator of said two or more resonators is tuned to have a resonance frequency equal to a resonance frequency of a respective one of said elastic modes of oscillation.

13. A method as in claim 12, wherein at least one of said at least one second resonator is tuned to have a Q-factor equal to a Q-factor of a respective one of said elastic modes of oscillation.

14. A method of actuating a system comprising a movable component and an actuator configured to move said movable component, comprising:
    providing a control signal representative of a desired motion of said movable component;
    supplying said control signal to one or more resonators, each of said one or more resonators having a mode of oscillation representative of at least one elastic mode of oscillation of said system, wherein at least one of said one or more resonators is tuned to have a resonance frequency within a frequency band comprising two or more of said elastic modes of oscillation and to have a bandwidth equal to or greater than a width of said frequency band;
    modifying said control signal by subtracting from said control signal one or more signals representative of a response of said one or more resonators to said control signal; and
    operating said actuator in accordance with said modified control signal,
    wherein an amplitude and a phase of an output signal of each of said one or more resonators are adjusted to create an adjusted output signal of each of said one or more resonators and said adjusted signals are subtracted from said control signal to create said modified control signal.

15. An apparatus for modifying a control signal for actuation of a system comprising a movable component and an actuator configured to move said movable component, said apparatus comprising:

one or more resonators, each of said one or more resonators being tunable to have a mode of oscillation representative of at least one elastic mode of oscillation of said system, wherein at least one of said one or more resonators is tuned to have a resonance frequency within a frequency band comprising two or more of said elastic modes of oscillation and to have a bandwidth equal to or greater than a width of said frequency band;

an input section adapted to receive said control signal and to supply said control signal to said one or more resonators;

a subtractor adapted to create a modified control signal by subtracting from said control signal one or more signals representative of a response of said one or more resonators to said control signal;

an output section adapted to output said modified control signal; and a regulating section adapted to receive an output signal from each of said one or more resonators, the regulating section being adapted to adjust an amplitude and a phase of said output signal and to supply said adjusted output signals to said subtractor.

* * * * *